United States Patent [19]

Yoshida

[11] 3,933,239

[45] Jan. 20, 1976

[54] CAPSULE POSITIONING MACHINE

[75] Inventor: Haruhiko Yoshida, Osaka, Japan

[73] Assignee: Takeda Chemical Industries, Ltd., Osaka, Japan

[22] Filed: Nov. 11, 1974

[21] Appl. No.: 522,865

[30] Foreign Application Priority Data

Nov. 15, 1973 Japan ............................ 48-129027

[52] U.S. Cl. ................ 198/287; 198/276; 198/288; 198/271; 221/173

[51] Int. Cl.$^2$ ........................................ B65G 47/24

[58] Field of Search ........................... 198/268–271, 198/287, 288, 276, 277, 282, 283, 246, 248, 249, 251; 221/173, 211

[56] References Cited

UNITED STATES PATENTS

| | | | |
|---|---|---|---|
| 2,843,254 | 7/1958 | Vaughan | 221/173 |
| 3,517,796 | 6/1970 | Aidlin et al. | 198/287 |
| 3,613,861 | 10/1971 | Whitecar | 198/271 |
| 3,871,295 | 3/1975 | Ackley | 198/249 |

*Primary Examiner*—Evon C. Blunk
*Assistant Examiner*—Robert Saifer
*Attorney, Agent, or Firm*—Wenderoth, Lind & Ponack

[57] ABSTRACT

A capsule positioning machine for supplying a plurality of capsules successively in a predetermined posture, which is useable with the capsules each composed of a container and a cap mounted thereon. The machine comprises a transport drum and an inverting drum both supported for rotation in the opposite directions at the same peripheral velocity and formed with a plurality of pockets. Each of the pockets in the transport drum is stepped to provide a large diameter portion of a diameter slightly greater than the outer diameter of the cap of each of the capsules and a reduced diameter portion of a diameter substantially equal to or slightly smaller than the outer diameter of the cap, but slightly greater than the outer diameter of the container. Any of the capsules received in the respective pockets in the transport drum with the container engaged in the reduced diameter portion can be transferred to the inverting drum thereby to invert the posture of the capsule.

4 Claims, 7 Drawing Figures

CAPSULE POSITIONING MACHINE

Figure 1:
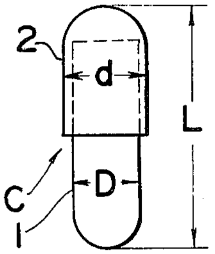

The present invention relates in general to a capsule attitude control and, more particularly, to a device for supplying a plurality of capsules successively in a predetermined posture.

The present invention is particularly applicable with capsules of a particular construction each composed of a substantially cylindrical, open-ended container and a cap being similar in shape to the container and mounted on the container with the open end of said container inserted into said cap. This type of capsule is widely used in the pharmaceutical industry for enclosing a dose of an oral medicine.

It is well known that capsules each containing a dose of an oral medicine are commerically available, for example, at pharmacist's shops, in the form as contained in a bottled or a blistered package. The present invention has no concern with the bottled package, but has a concern with the blistered package.

The blistered package is known as a package composed of a sheet of thermoplastic resin, formed with a plurality of recesses or blisters in a predetermined pattern for accommodating therein respective capsules, and a covering, usually made of an aluminum foil, heat-sealed to the thermoplastic sheet with the capsules respectively accommodated in said blisters. Removal of each of the capsules in the blistered package can be carried out by applying a finger pressure to the capsule through the corresponding blister to cause a portion of the aluminum covering to break.

Considering the process of filling and packing each of the capsules, the capsule is successively and sequentially subjected to a medicine filling step wherein a dose of an oral medicine is filled in the container, a capping step wherein the container, that has been filled with the medicine, is capped with the cap to provide a complete capsule, a printing step wherein a trademark, brand, lot number and/or like indicia is printed on the capsule, an inspection step wherein the appearance of the capsule is inspected and a packaging step wherein the capsule is packed in a blistered package. Except for the medicine filling and capping steps, it has long been desired that a mass of complete capsules are arranged in a predetermined position or posture to facilitate the subsequent steps.

By way of example, where a particular trademark is to be printed on the cap of each of the capsules while the capsules are successively transferred by a conveyance. For example, an endless belt conveyor, past a printing or branding station, reproduction of the trademark on the capsules without accompanying any displacement of the subsequently printed trademark from a predetermined position cannot satisfactorily be achieved unless all of the capsules being successively past the printing or branding station are otherwise arranged in a predetermined position or posture, for example, with the individual caps of the capsules oriented in the same direction.

Moreover, irrespective of the employment of the printing or branding station, arbitary positioning of the capsules in a blistered package often gives such an impression that the capsules in the blistered package would not have been quality-controlled during the manufacture thereof.

Similar disadvantages and inconveniences have been encountered in any other industry where articles or sheaths similar in shape to the capsules are extensively handled.

In order to avoid the disadvantages and inconveniences hereinabove described, a capsule positioning machine has heretofore been employed. In general, the prior art capsule positioning machine cannot continuously be operated and has to be intermitted each time the attitude control is effected in such a way as to push a pushing rod to one of capsules, suspended in respective cavities or recesses formed in a rotary drum at the periphery thereof, to cause the capsule to pivot about a pair of opposed contact points by which the capsule is suspended in the corresponding cavity or recess. This prior art capsule positioning machine is not reliable and does not satisfactorily operate to an extend that all of the capsules handles can be positioned in a predetermined posture.

Moreover, in order for the capsules to be handled by the prior art capsule positioning machine, each of the capsules should accurately be shaped relative to the dimension of each of the cavities or recesses. If some of the capsules to be handled with the prior art capsule positioning machine are deformed such that the cross section thereof represents a substantially elliptical shape, these capsules will no longer be retained in the cavities or recesses and, therefore, cannot be handled with the prior art capsule positioning machine.

Accordingly, an essential object of the present invention is to provide an improved capsule positioning machine capable of continuously positioning capsules in a predetermined posture, thereby substantially eliminating the disadvantages and inconveniences inherent in the prior art capsule positioning device.

Another important object of the present invention is to provide an improved capsule positioning machine which is reliable in operation and which can satisfactorily operate even with some of the capsules which are deformed in cross section.

Figure 3:
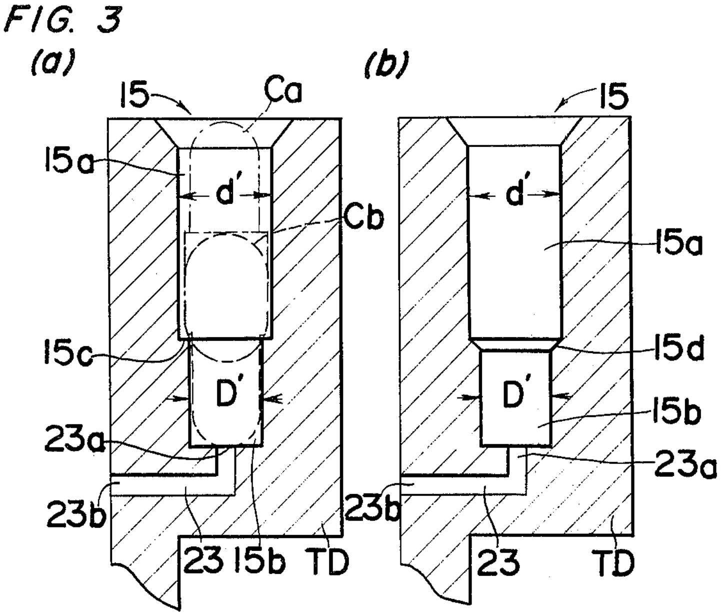
Figure 2:
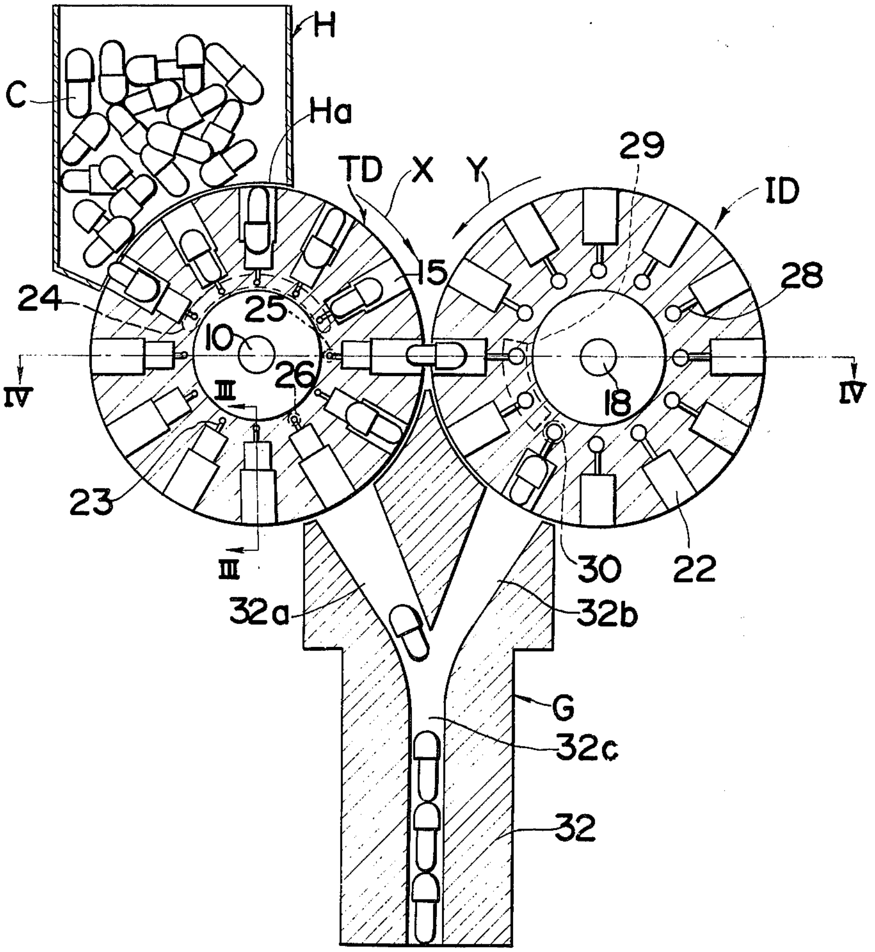
Figure 4:
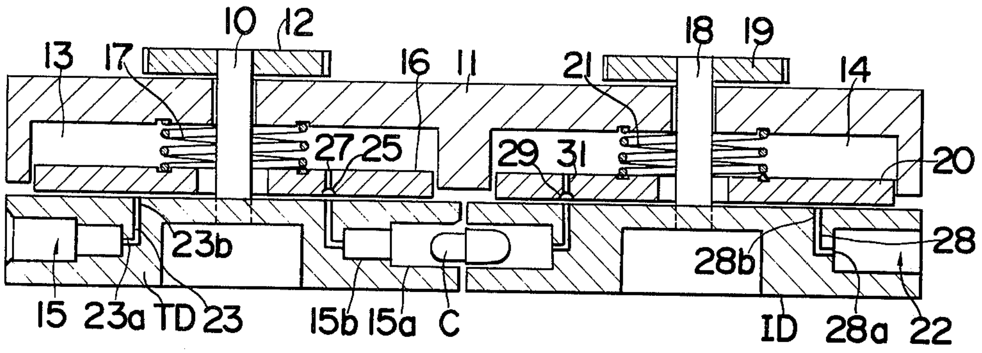
Figure 5:
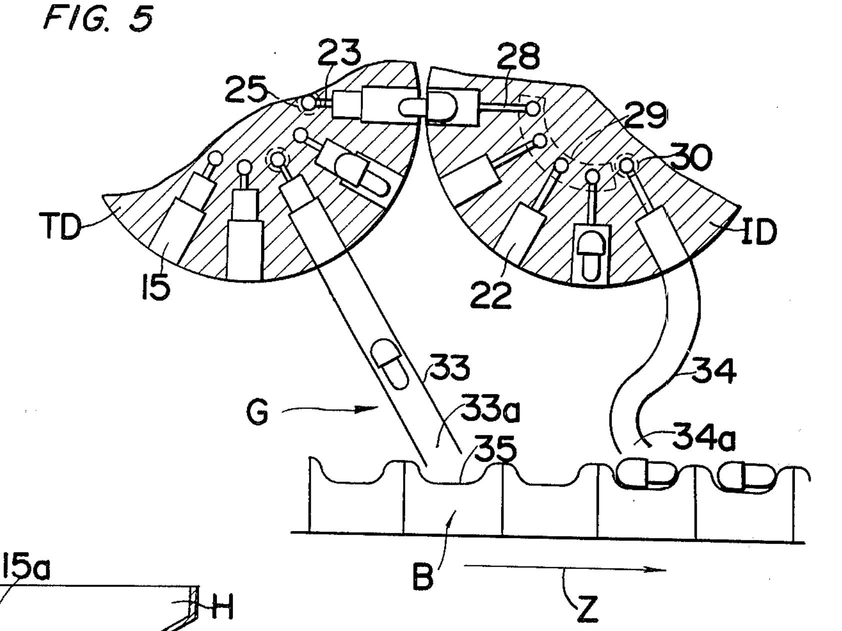
Figure 6:
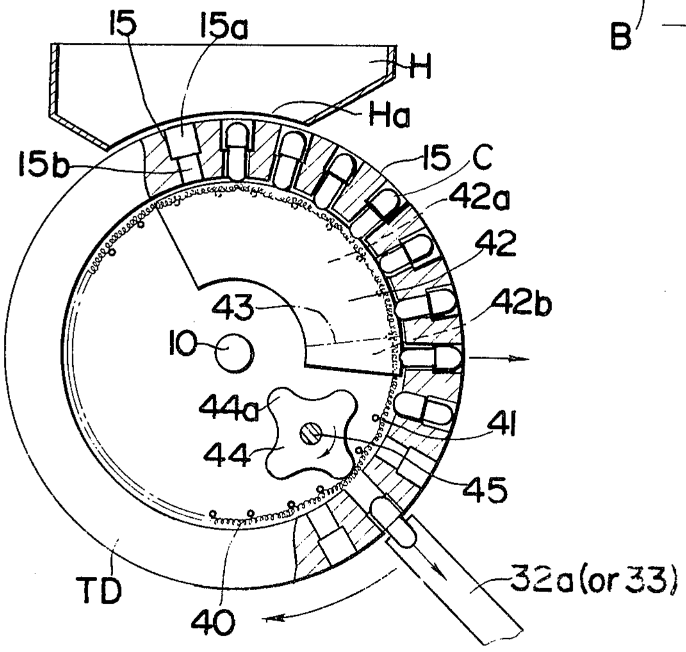

Because of the nature of the present invention, it will readily be described in conjunction with preferred embodiments thereof with reference to the accompanying drawings, in which:

FIG. 1 is a schematic diagram showing the shape of a capsule which can be employed with the capsule positioning machine according to the present invention, FIG. 2 is a schematic sectional view of the capsule positioning machine according to one embodiment of the present invention, FIG. 3(a) is a cross sectional view, on an enlarged scale, taken along the line III—III in FIG. 2, illustrating the details of a capsule receiving pocket, FIG. 3(b) is a similar view to FIG. 3(a), illustrating a modification of FIG. 3(a), FIG. 4 is a cross sectional view, on an enlarged scale, of the capsule positioning machine of FIG. 2, taken along the line IV—IV in FIG. 2, FIG. 5 is a schematic diagram of a portion of the capsule positioning machine, showing another method of ejecting capsules onto a conveyance, and FIG. 6 is a schematic diagram of a transport drum of the capsule positioning machine according to another embodiment of the present invention.

Before the description of the present invention proceeds, it should be noted that like parts are designated by like reference numerals throughout the accompanying drawings. In addition, it is also to be noted that the term "capsule" employed in this specification and appended claims should not be understood as meaning a capsule used in the pharmaceutical industry for enclosing a dose of an oral medicine, whetherever empty or actually containing the medicine, but is to be understood as meaning a sheath or similar enclosure for any purpose, for example, for enclosing and/or protecting a candy, a miniture toy, or any other article of manufacture, which is essentially composed of a container and a cap mounted thereon.

More particularly, with reference to FIG. 1, the details of the capsule which the capsule positioning machine of the present invention can handle will now be described. As shown, the capsule C is of a substantially cylindrical, elongated shape and has a length designated by L. This capsule C comprises a substantially cylindrical container 1 of an outer diameter D having one end open and the other end closed and outwardly rounded. The capsule C further comprises a cap 2 similar in shape to the container 1 and having an outer diameter *d*, one end of which is opened while the other end thereof is closed and outwardly rounded, said cap 2 being mounted on the container 1 with the open end portion of said container 1 received or inserted in the hollow of the cap 2. The length L of the complete capsule C is not the sum of the length of the container 1 and that of the cap 2, but is smaller than the sum of the respective lengths of the container 1 and cap 2 because of the open end portion of either of the cap 2 and container 1 overlapping the open end portion of the other of said cap 2 and container 1.

The capsule C is preferably made of flexible material, for example, a water-soluble gelatine in case of the capsule for the medicine or any synthetic resin having an elasticity, by the reason which will become clear later.

Referring now to FIGS. 2 and 4, a capsule positioning machine according to the present invention comprises a supply hopper H of a substantially cubic body for accommodating a mass of capsules of the construction as shown in FIG. 1. This hopper H is formed at the bottom thereof with an opening H*a*, and is stationarily supported in position to a portion of a machine framework (not shown). The capsule positioning machine shown further comprises a pair of transport and inverting drums TD and ID both supported for rotation in the opposite directions at the same peripheral velocity in such a manner as will now be described.

The transport drum TD is non-rotatably mounted on a shaft 10 which axially non-movably, but rotatably, extends through a back-up structure 11 and is in turn mounted with a gear 12 for rotation together with said shaft 10. The back-up structure 11 may be a part of the machine framework, or otherwise be rigidly secured or mounted on the machine framework, and has a pair of spaced recesses 13 and 14 on one surface thereof facing the transport and inverting drums TD and ID, respectively.

The transport drum TD has an outer peripheral surface formed with a plurality of radially inwardly extending pockets 15, the details of each of which will be described later, which pockets 15 are circumferentially equally spaced from each other over the outer peripheral surface of said transport drum TD.

Within the recess 13 in the back-up structure 11, there is provided a substantially annular presser disc 16 which is non-displaceably accommodated within said recess 13 and is, by a compression spring 17 stationarily held between said back-up structure 11 and said presser disc 16 around the shaft 10, biased in one direction close to said transport drum TD so that one of the opposed surfaces of said presser disc 16 is in sliding contact with one of the opposed surfaces of said transport drum TD.

THe inverting drum ID is supported sidewise of and adjacent the transport drum TD in a similar manner as the transport drum TD is supported. More particularly, the inverting drum ID is non-rotatably mounted on a shaft 18 which axially non-movably, but rotatably, extend through the back-up structure 11 in alignment with the recess 14 and is in turn mounted with a gear 19 for rotation together with said shaft 18. Within the recess 14 in the back-up structure 11, there is also provided a substantially annular presser disc 20 which is non-displaceably accommodated within said recess 14 and is, by a compression spring 21 stationarily held between said back-up structure 11 and said presser disc 20 around the shaft 18, biased in one direction close to said presser disc 20 so that one of the opposed surfaces of said presser disc 20 is in sliding contact with one of the opposed surfaces of said inverting drum ID.

The inverting drum ID has an outer peripheral surface formed with inverting pockets 22 circumferentially equally spaced from each other. It is to be noted that, if the transporting and inverting drum TD and ID are of the same outer diameter as is the case of the illustrated embodiment, the number of the pockets 15 and the pitch between each adjacent pair of the pockets 15 should be the same as the number of the pockets 22 and the pitch between each adjacent pair of the pockets 22. Alternatively, if the transport and inverting drums TD and ID are of different outer diameters, the number of the pockets 15 may differ from that of the pockets 22 so far as the pitch between each adjacent pair of the pockets 15 is equal to that of the pockets 22 and both of the drums TD and ID are rotated at the same peripheral velocity.

The gears 12 and 19 on the respective shafts 10 and 18 are to be understood as forming parts of a power transmission system (not shown) through which an electric drive motor (not shown) is operatively coupled thereto for rotating said drums TD and ID in the opposite directions at the same velocity, or otherwise at the same peripheral velocity if the drums TD and ID are of different outer diameters as hereinabove described.

These drums TD and ID are positioned relative to each other such that the outer peripheral surfaces of said respective drums TD and ID substantially contact to each other at one point which is hereinafter referred to as a meeting point. Alternatively, there may be a space between the outer peripheral surfaces of said drums TD and ID if the space therebetween is not more than half of the length L of the capsule C.

With particular reference to FIG. 3(a) wherein only one of the pockets 15 is illustrated, the pocket 15 is of a cylindrical hollow and has a large diameter portion **15*a* adjacent the outer peripheral surface of the transport drum TD and a reduced diameter portion 15*b* adjacent the bottom thereof, both being divided by a step as at 15*c*. The depth of the large diameter portion 15*a* as defined by a distance between the plane of the opening of the pocket 15 on the peripheral surface of the drum TD and the step 15*c* is selected such that the capsule C, which is accommodated within said pocket 15 with the cap 2 radially inwardly oriented towards the bottom of said pocket 15** in such a manner as substantially indicated by the chain line C*a* in FIG. 3(a), can completely be concealed within the pocket 15, and is therefore equal to or slightly smaller than the length L of the capsule C. On the other hand, the depth of the reduced diameter portion 15*b* as defined by a distance between the step 15*c* and the bottom of the pocket 15 is smaller than the difference between the length L of the capsule C and the length of the cap 2, that is, the length of a portion of the container 1 which is not overlapped with the cap 2. Furthermore, the large and reduced diameter portions 15*a* and 15*b* of the pocket 15 have respective diameters $d'$ and $D'$ which satisfy the following relationships with respect to the size of the capsule C:

$$D < D' \leqq d < d'$$

The step between the large and reduced diameter portions 15*a* and 15*b* of the pocket 15 may be radially inwardly tapered such as indicated by 15*d* in FIG. 3(*b*). The employment of the radially inwardly tapered step 15*d* is in most cases because it does not provide a trave of contact between the rounded end of the cap 2 of the capsule C and the step 15*d* when the former is sucked into the pocket 15 in a manner as will be described later.

While each of the pockets 15 in the transport drum TD is constructed such as hereinabove described, these pockets 15 are successively and sequentially communicated to a source of vacuum (not shown) and then to a source of compressed air, as said drum TD rotates through 360° about the shaft 10, for the purpose which will become clear from the subsequent description. To this end, the transport drum TD is formed therein with substantially L-shaped passages 23 corresponding in number to the pockets 15. Each of these passages 23 has one end 23*a* opening at the bottom of the corresponding pocket 15 and in communication therewith and the other end 23*b* opening at one of the opposed surfaces of the drum TD which is in sliding contact with the presser disc 16. The individual ends 23*b* of these passages 23 are arranged in a circular configuration and are equally spaced from each other and also from the axis of rotation of the transport drum TD.

On the other hand, the presser disc 16 is formed on one surface thereof with a curved groove 24 and a pair of spaced recesses 25 and 26, all of which are positioned in alignment with the path of travel of any of the open ends 23*b* of the passages 23 in transport drum TD. The curved groove 24 is in communication with the source of vacuum through a passage (not shown) in the presser disc 16 by means of any suitable tubing (not shown) in a substantially similar manner as the recess 25 is, as shown in FIG. 4, in communication with the source of compressed air through a passage 27 in the presser disc 16 by means of any suitable tubing (not shown). It is to be noted that the recess 26 is also communicated to the source of compressed air in the same manner as the recess 25.

The curved groove 24 angularly extends through a predetermined angle about the axis of rotation of the drum TD and has a leading end situated preceding the recess 25 which is located at the meeting point where the pockets 15 in the transport drum TD and the pockets 22 in the inverting drum ID are successively aligned to each other in such a manner that the longitudinal axis of each of the pockets 15 becomes in line with that of the corresponding pocket 22. The other end, that is, a trailing end, of the curved groove 24 is situated on the trailing side of the bottom opening H*a* of the supply hopper H with respect to the direction of rotation of the transport drum TD as indicated by the arrow-headed line X in FIG. 2.

The recess 26 may be formed in the presser disc 16 anywhere between the recess 25 and the trailing end of the curved groove 24 in alignment with the path of travel of the open ends 23*b* of the passages 23 in the transport drum TD.

In the capsule positioning machine so far described, as the transport drum TD rotates in the direction X, some of the capsules within the supply hopper H are successively received in the pockets 15. It is obvious that the capsules received in the respective pockets 15 are not always in the same posture and some capsules are received in the pockets 15 with the associated caps 2 radially outwardly oriented as shown by C*b* in FIG. 3(*a*) and the others are received in the pockets 15 with the associated caps 2 radially inwardly oriented as shown by C*a* in FIG. 3(*a*).

All of these capsules are, irrespective of their respective postures within the corresponding pockets 15 in the transport drum TD being rotated, transferred to the meeting point in such a manner that they are sucked into said corresponding pockets 15 by the suction force exerted upon communication of the curved groove 24 to the vacuum source. However, in the case where the diameter $D'$ of the reduced diameter portion 15*b* is smaller than the outer diameter $d$ of the cap 2, the capsule received in the pocket 15 with the cap 2 radially inwardly oriented is held in position within the pocket 15 in such a manner that the rounded end of the cap 2 is elastically thrusted into the reduced diameter portion 15*b* to an extent that it will no longer separate from the pocket 15 without any external pushing force.

The capsules received in the corresponding pockets 15 are, as they successively arrive at the meeting point, ejected out of the corresponding pockets 15 by a blast of compressed air applied thereto through the passages 23 upon successive communication of said passages 23 to the compressed air source. However, some of the capsules that have been received in the pockets 15 with the caps 2 radially inwardly oriented remain within the pockets 15 without being ejected out of the pockets 15 because the rounded end of each of these capsules is, as hereinbefore described, elastically thrusted into the reduced diameter portion 15*b* in the case where the diameter $D'$ is smaller than the outer diameter $d$, or because the cap 2 of each of these capsules is tightly held within the reduced diameter portion 15*b* in the case where the diameter D is substantially equal to the outer diameter $d$.

The capsules that are retained within the corresponding pockets 15 without being ejected at the meeting point are then transferred to an delivery station where said pockets 15 carrying said capsules are successively communicated to the compressed air source through the recess 26. It is to be noted that the pressure of compressed air applied into the pockets 15 through the recess 26 is so higher than that applied into the pockets 15 through the recess 25 that any of the capsules received in the pockets 15 with the cap 2 radially inwardly oriented can easily be separated out of the corresponding pocket 15. The pressure difference between the compressed air applied through the recess 25 and that applied through the recess 26 can be created by providing any suitable pressure regulating valve on a fluid line connecting between the common compressed air source and the recess 25. Alternatively, separate sources of compressed air may be employed one in communication to the recess 25 and the other in communication to the recess 26.

The capsules successively ejected out of the corresponding pockets 15 are transferred to a subsequent process through a guide G, which will be described later in detail, for guiding the capsules in the same posture towards the subsequent process.

Each of the capsules received in the corresponding pockets 15 with the caps 2 radially outwardly oriented and subsequently ejected therefrom at the meeting point is transferred onto one of the pockets 22 in the inverting drum ID which is then aligned with the corresponding pocket 15. It is to be noted that each of the pockets 22 in the inverting drum ID is of a size having a diameter substantially equal to the diameter *d'* of the large diameter portion 15*a* of the pocket 15 in the transport drum TD and a depth substantially equal to or slightly greater than the length L of the capsule C.

Any of the pockets 22 in the inverting drum ID that is brought into the meeting point is at this time communicated to a source of vacuum. For this purpose, in a quitely similar manner as in the transport drum ID and the presser disc 16, the inverting drum ID is formed therein with substantially L-shaped passages 28 each having one end 28*a* opening at the bottom of the corresponding pocket 22 and in communication therewith and the other end 28*b* opening at one surface of the drum ID which is in sliding contact with the presser disc 20 while the presser disc 20 is formed on one surface thereof with a curved groove 29 and a recess 30 which are respectively communicated to a source of vacuum through a passage 31, formed in the presser disc 20, and to a source of compressed air. It is to be noted that the source of vacuum in communication with the curved groove 29 and the source of compressed air in communication with the recess 30 may be the same as that in communication with the curved groove 24 and that in communication with any of the recesses 25 and 26, respectively.

The curved groove 29 in the presser disc 20 has a leading end terminating at a position preceding the recess 30 and a trailing end situated in alignment with the meeting point of these drums TD and ID. It is to be noted that the position of the recess 30 should, in the embodiment shown in FIGS. 2 and 4, be selected such that the angular distance between the trailing end of the curved groove 29 and the recess 30 in the direction of rotation of the inverting drum ID is substantially equal to the angular distance between the recesses 25 and 26 in the direction of rotation of the transporting drum TD. In the embodiment illustrated, while the recesses 25 and 26 are spaced from each other at the interval of one pocket 15, the trailing end of the curved groove 29 and the recess 30 are spaced from each other at the same interval with the length of said curved groove 29 sufficient to cover the two open ends 28*b* of the passages 28, respectively.

The guide G so far illustrated in FIG. 2 comprises a block 32 stationarily supported, for example, by the machine framework and formed therein with a substantially Y-shaped feed duct having three duct portions 32*a*, 32*b* and 32*c*. This guide block 32 is arranged in such a manner that the duct portion 32*a* faces the transport drum TD at the delivery station in readiness for receiving the capsules ejected from the pocket 15 at said delivery station, the duct portion 32*b* faces the inverting drum ID at a position corresponding to the position of the recess 30 in readiness for receiving the capsules ejected from the pockets 22 in the inverting drum ID and the duct portion 32*c*, is downwardly oriented for permitting the capsules collected therein to chute down the duct portion 32*c* by gravity onto the subsequent process. For transferring the capsules emerging from the lower opening of the duct portion 32*c* to the subsequent process, any suitable endless belt conveyor of a type having an endless belt formed on one surface with a plurality of equally spaced recesses each similar in shape to the capsule can be employed.

From the foregoing description, it has now become clear that, while any of the capsules received in the respective pockets 15 in the transport drum TD in the manner as indicated by the chain line C*a* in FIG. 3(a) can successively be ejected at the delivery station without being ejected therefrom at the meeting point, any of the capsules received in the respective pockets 15 in the transport drum TD in the posture as indicated by the dotted or broken line C*b* in FIG. 3(a) can successively be ejected therefrom at the meeting point without being transferred to the delivery station of the transport drum TD. It is also clear that the capsules successively ejected from the pockets 15 and then sucked into the respective pockets 22 in the inverting drum ID are ejected onto the duct portion 32*b* in the inverted posture with respect to the posture of each of the capsules ejected into the duct portion 32*a*, upon communication of any of said pockets 22 to the compressed air source through the recess 30.

The interval between the pocket 22 at the meeting point and the pocket 22 in register with the duct portion 32*b* may not be the same as the interval between the pocket 15 at the meeting point and the pocket in register with the duct portion 32*a*. In order to achieve this, reference will now be made to FIG. 5. From FIG. 5, it will readily be seen that the guide G comprises separate ducts 33 and 34. A belt conveyor B of a type having an upper surface formed with a plurality of equally spaced recesses 35 each similar in shape to the capsule C is adapted to travel in one direction as indicated by Z in a manner synchronized with the rotation of any of the transport and inverting drums TD and ID. More particularly, in the arrangement shown in FIG. 5, the transport drum TD, the inverting drum ID and the conveyor B are interrelated or synchronized with each other such that the time required for one of the recesses 35 in the conveyor B, which has not received any capsule from the exit end 33*a* of the duct 33, to arrive at a position in register with the exit end 34*a* of the duct 34 is equal to the time required for one of the capsules transferred from the pocket 15 to the pocket 22 at the meeting point at the time said one of said recesses 35 has been in register with the exit end 33*a* of the duct 33 to arrive at the position where said one of said capsules is ejected onto duct 34. In other words, the duct 34 is positioned relative to the duct 33 such that the capsule can be supplied onto the conveyor B from the pocket 22 in the inverting drum ID after the lapse of time corresponding to an integer multiple of the time required for each of the recesses 35 to travel a distance corresponding to one pitch between the adjacent pair of said recesses 35.

Although the present invention has been fully described by way of the preferred embodiments thereof, it should be noted that various changes and modifications are apparent to those skilled in the art. By way of example, depending upon the type of the subsequent process to which the capsules which have been positioned in the predetermined posture by the positioning machine, only the transport drum TD will suffice in which case any suitable return tubing may be employed for returning successively capsules which are ejected from the pockets in the transport drum TD at the meeting point back to the supply hopper H. In addition, the fluid connection between the recess 30 in the presser disc 20 and the source of compressed air may not always be necessary if the position where the capsules are successively ejected onto the duct portion 32*b* or the duct 34 is downwardly oriented so that these capsules can fall by gravity from the respective pockets 22 onto the duct portionn 32*b* or the duct 34. It is also possible to make the capsule be transferred by its own gravity onto the corresponding pocket 22 from the pocket 15 if the drums TD and ID are arranged such that the common imaginary line passing through the axes of rotation of these drums extends in parallel relation to the vertical line with the drum TD positioned immediately above the drum ID. In this case, the fluid connection between the recess 25 and the source of compressed air may not be necessary.

Furthermore, the transport drum TD may be constructed such as shown in FIG. 6. In the arrangement of FIG. 6, each of the capsules received in the pockets 15 are, in view of the fact that these pockets 15 in this example are bottomless, supported on a coiled spring 40. The coiled spring 40 has both ends joined together and is suspended around a plurality of support pins 41 equally spaced from each other in the circumferential direction of the transport drum TD and each extending in parallel to the longitudinal axis of the shaft 10, so that any portion of said coiled spring 40 extends across each of the pockets 15 for supporting thereon the capsule that has been received in the pocket 15. A sector-shaped duct 42 having the interior divided by a partition plate 43 into a suction chamber 42*a* and a blow-off chamber 42*b* which are respectively communicated to the vacuum source and the compressed air source is supported in position to transport the capsules sucked into the corresponding pockets from the position immediately below the supply hopper H to the meeting point where the capsules are successively ejected onto the inverting drum. An ejector wheel 44 having a plurality of radially outwardly extending projections 44*a*, which projections 44*a* are equally spaced from each other a distance corresponding to the pitch between the adjacent pair of the pockets 15, is supported on a drive shaft 45 for rotation together with said shaft 10. The shaft 45 is in turn operatively coupled to an electrically operated motor which may be the same as used to rotate the drums TD and ID.

The arrangement of FIG. 6 is particularly useable where the reduced diameter portion 15*b* of each of the pockets 15 is of the diameter substantially equal to the outer diameter *d* of any of the caps 2 of the respective capsules. With this in mind, it is clear that the capsules which have not ejected or transferred onto the inverting drum ID at the meeting point are successively ejected at the delivery station by the ejector wheel 44 acting in such a manner that, as it rotates in the same direction as the direction of rotation of the transport drum TD, the projections 44*a* thereof engage into respective reduced diameter portions 15*b* of the pockets 15 thereby pushing the associated capsules through the coiled spring out therefrom onto the duct portion 32*a* or the duct 33.

Therefore, these changes and modifications are to be understood as included within the true scope of the present invention unless they depart therefrom.

What is claimed is:

1. A capsule positioning machine for supplying a plurality of capsules in a predetermined posture, each of said capsules being composed of a substantially cylindrical container and a substantially cylindrical cap which is mounted on and, therefore, overlaps one end portion of said container thereby defining a capsule chamber, said capsule positioning machine comprising:

a supply hopper for accommodating said capsules therein in any arbitrary posture and having the bottom opened;

a transport drum supported substantially below said bottom of said supply hopper for rotation in one direction and having a plurality of radially inwardly extending pockets which are spaced from each other at equal intervals around the periphery of said transport drum, said pockets being adapted to receive therein said capsules in any arbitrary posture from said supply hopper, the interior of each of said pockets being stepped to provide a large diameter portion adjacent the periphery of said transport drum and a reduced diameter portion remote from the periphery of said transport drum, each of said pockets having a size satisfying the following relations, $$D < D' \leqq d < d'$$

and $$l < La$$

wherein D represents an outer diameter of the container, D′ represents a diameter of the reduced diameter portion of said pocket, *d* represents an outer diameter of the cap, *d′* represents a diameter of the large diameter portion of the same pocket, *l* represents the depth of the reduced diameter portion of the same pocket and La represents the difference between the total length of the capsule and the length of the cap of the same capsule;

means for driving said transport drum so as to rotate said transport drum in said one direction, said transport drum being, during each rotation thereof, sequentially brought to supply, ejecting and delivery stations located around the transport drum in the direction of rotation of said transport drum;

first means operatively positioned for permitting said capsules to be received in the corresponding pockets in said transport drum at said supply station in any arbitrary posture and for permitting said capsules held within said pockets in said transport drum to be transferred towards said ejecting station as said transport drum rotates, comprising means for drawing air within each of said pockets to create a substantial vacuum therein;

second mean operatively positioned for permitting only the capsules, which are held in the associated pockets with the cap radially outwardly oriented, to be ejected out of said associated pockets at said ejecting station of said transport drum;

third means operatively positioned for permitting the capsules, which have been transported to said delivery station of said transport drum while held in the associated pockets with the cap radially inwardly oriented, to be ejected out of said associated pockets at said delivery station; and fourth means positioned adjacent said transport drum at said delivery station for receiving the capsules, which have successively been ejected out of said pockets at said delivery station with the container outwardly oriented, and for subsequently feeding them to a subsequent process.

2. A capsule positioning machine as claimed in claim 1, further comprising an inverting drum supported adjacent said transport drum at said ejecting station of said transport drum for rotation in the opposite direction with respect to the rotational direction of said transport drum and at the same peripheral velocity as said transport drum and having a plurality of radially inwardly extending pockets which are spaced from each other at equal intervals around the periphery of said inverting drum, said interval being equal to the interval between each adjacent pair of said pockets in said transport drum such that, during rotation of said transport and inverting drums in the opposite directions, said pockets in said transport drum and said pockets in said inverting drum are successively aligned with each other at said ejecting station of said transport drum, said capsules, which have successively been ejected from said transport drum at said ejecting station, being successively received in said pockets in said inverting drum with the cap radially inwardly oriented during rotation of said transport and inverting drums in said opposite directions and then transferred towards a delivery station of said inverting drum, fifth means operatively positioned for permitting the capsules, that have successively been transferred onto the pockets in the inverting drum, to be received in said pockets in said inverting drum and then to be transported to the delivery station of said inverting drum, sixth means operatively positioned for permitting the capsules held within the pockets in said inverting drum to be ejected out of said pockets in said inverting drum at said delivery station of said inverting drum, seventh means positioned adjacent said inverting drum at said delivery station of said inverting drum for receiving the capsules, which have successively been ejected out of said pockets at said delivery station of said inverting drum with the container outwardly oriented, and for subsequently feeding them to the subsequent process, and means for driving said inverting drum so as to rotate said inverting drum in said opposite direction and at said peripheral velocity.

3. A capsule positioning machine as claimed in claim 2, wherein said driving means for said transport drum and said driving means for said inverting drum comprise an electric drive motor operatively coupled to both said drums through a transmission system.

4. A capsule positioning machine as claimed in claim 3, wherein said fourth and seventh means comprise a common guide having a substantially Y-shaped passage formed therein and including a passage portion opening at said delivery station of said transport drum, a second passage portion opening at said delivery station of said inverting drum and a third passage portion having one end coupled to said first and second passage portions and the other end leading to the subsequent process.

* * * * *